US007296003B2

(12) United States Patent
Mersky et al.

(10) Patent No.: US 7,296,003 B2
(45) Date of Patent: Nov. 13, 2007

(54) METHOD AND APPARATUS FOR FACILITATING MANUAL PAYMENTS FOR TRANSACTIONS CONDUCTED OVER A NETWORK

(75) Inventors: Randy Mersky, Ellicott City, MD (US); Lewis Riggle, Winter Park, FL (US); David Willis, Sanford, FL (US)

(73) Assignee: Globex Financial Services, Inc., Silver Spring, MD (US)

( * ) Notice: Subject to any disclaimer, the term of this patent is extended or adjusted under 35 U.S.C. 154(b) by 860 days.

(21) Appl. No.: 09/931,187

(22) Filed: Aug. 17, 2001

(65) Prior Publication Data

US 2003/0037012 A1 Feb. 20, 2003

(51) Int. Cl.
*G06Q 99/00* (2006.01)
(52) U.S. Cl. ............... 705/78; 705/1; 705/65; 705/75; 705/80; 713/150; 235/379
(58) Field of Classification Search ............ 705/64–80, 705/1, 26; 713/150; 235/379
See application file for complete search history.

(56) References Cited

U.S. PATENT DOCUMENTS

| | | |
|---|---|---|
| 4,654,482 A | 3/1987 | DeAngelis |
| 4,694,397 A | 9/1987 | Grant et al. |
| 4,799,156 A | 1/1989 | Shavit et al. |
| 4,823,264 A | 4/1989 | Deming |
| 4,858,121 A | 8/1989 | Barber et al. |
| 4,947,028 A | 8/1990 | Gorog |
| 5,007,084 A | 4/1991 | Materna et al. |
| 5,025,373 A | 6/1991 | Keyser, Jr. et al. |
| 5,050,207 A | 9/1991 | Hitchcock |
| 5,220,501 A | 6/1993 | Lawlor et al. |
| 5,252,811 A | 10/1993 | Henochowicz et al. |
| 5,283,829 A | 2/1994 | Anderson |

(Continued)

FOREIGN PATENT DOCUMENTS

EP 0 708 417 4/1996

(Continued)

OTHER PUBLICATIONS

"Western Union Service for Overdue Accoutns Resolving Delinquent Cards", Aug. 13, 1990, Gale Group Newsletter.*

(Continued)

*Primary Examiner*—Jalatee Worjloh
(74) *Attorney, Agent, or Firm*—Greenblum & Bernstein, P.L.C.

(57) ABSTRACT

A system enables tender of payment manually (e.g., cash, check, etc.) for transactions conducted over a network (e.g., the Internet). The system includes one or more computer systems each located at a corresponding agent site, one or more merchant systems and a server computer system in communication with the agent and merchant systems. The server system accesses the appropriate merchant network or web site in response to transaction selection information received from the agent system, and translates those web pages for transmission to the agent system. The server computer system further receives the required transaction information from the agent system and processes the transaction information for transference to the particular merchant web site. In addition, the server system enters credit card information of a provider of the transaction service within the transaction payment information for transference to the merchant system in order to tender payment for the network transaction.

59 Claims, 4 Drawing Sheets

U.S. PATENT DOCUMENTS

| | | |
|---|---|---|
| 5,326,959 A | 7/1994 | Perazza |
| 5,336,870 A | 8/1994 | Hughes et al. |
| 5,383,113 A | 1/1995 | Kight et al. |
| 5,424,938 A | 6/1995 | Wagner et al. |
| 5,465,206 A | 11/1995 | Hilt et al. |
| 5,496,991 A | 3/1996 | Delfer, III et al. |
| 5,504,677 A | 4/1996 | Pollin |
| 5,546,303 A | 8/1996 | Helbling |
| 5,616,902 A | 4/1997 | Cooley et al. |
| 5,671,279 A | 9/1997 | Elgamal |
| 5,699,528 A | 12/1997 | Hogan |
| 5,754,654 A | 5/1998 | Hiroya et al. |
| 5,769,269 A | 6/1998 | Peters |
| 5,809,144 A | 9/1998 | Sirbu et al. |
| 5,825,881 A | 10/1998 | Colvin, Sr. |
| 5,832,451 A | 11/1998 | Flake et al. |
| 5,869,825 A | 2/1999 | Ziarno |
| 5,873,072 A | 2/1999 | Kight et al. |
| 5,884,288 A | 3/1999 | Chang |
| 5,897,625 A | 4/1999 | Gustin et al. |
| 5,920,847 A | 7/1999 | Kolling et al. |
| 5,940,813 A | 8/1999 | Hutchings |
| 5,943,656 A | 8/1999 | Crooks et al. |
| 5,956,700 A | 9/1999 | Landry |
| 5,966,698 A | 10/1999 | Pollin |
| 5,978,780 A | 11/1999 | Watson |
| 5,983,204 A * | 11/1999 | Debe ..................... 705/36 |
| 5,987,132 A | 11/1999 | Rowney et al. |
| 5,987,140 A | 11/1999 | Rowney et al. |
| 5,987,439 A | 11/1999 | Gustin et al. |
| 6,012,048 A | 1/2000 | Gustin et al. |
| 6,014,646 A | 1/2000 | Vallee et al. |
| 6,023,684 A | 2/2000 | Pearson |
| 6,029,150 A | 2/2000 | Kravitz |
| 6,032,133 A | 2/2000 | Hilt et al. |
| 6,058,381 A | 5/2000 | Nelson |
| 6,119,101 A | 9/2000 | Peckover |
| 6,119,105 A | 9/2000 | Williams |
| 6,119,106 A | 9/2000 | Mersky |
| 6,289,325 B1 * | 9/2001 | Nakamura et al. ............ 705/80 |
| 7,003,500 B1 * | 2/2006 | Driessen ...................... 705/74 |
| 2001/0037311 A1 * | 11/2001 | McCoy et al. ................. 705/65 |
| 2001/0044787 A1 * | 11/2001 | Shwartz et al. ............... 705/78 |
| 2002/0069166 A1 * | 6/2002 | Moreau et al. ................ 705/40 |
| 2002/0103756 A1 * | 8/2002 | Andrews et al. .............. 705/42 |
| 2003/0069857 A1 * | 4/2003 | Junda .......................... 705/74 |
| 2003/0101102 A1 * | 5/2003 | Kim ............................ 705/26 |
| 2003/0126067 A1 * | 7/2003 | Seifert et al. ................. 705/37 |
| 2003/0167392 A1 * | 9/2003 | Fransdonk .................. 713/156 |
| 2004/0143600 A1 * | 7/2004 | Musgrove et al. ....... 707/104.1 |

FOREIGN PATENT DOCUMENTS

| | | |
|---|---|---|
| EP | 0 969 429 A2 | 1/2000 |
| JP | 4-175991 | 6/1992 |
| JP | 07065206 | 3/1995 |
| JP | 10-079056 | 3/1998 |
| JP | 10-208090 | 8/1998 |
| JP | 10-240969 | 9/1998 |
| JP | 11-328453 | 11/1999 |
| WO | WO99/06967 | 2/1999 |
| WO | WO99/21141 | 4/1999 |
| WO | WO99/28830 | 6/1999 |
| WO | WO99/31600 | 6/1999 |
| WO | WO 00/13120 | 2/2000 |
| WO | WO 00/05667 | 3/2000 |
| WO | WO 01/11515 | 2/2001 |
| WO | WO 01/16768 | 3/2001 |

OTHER PUBLICATIONS

English language Abstract of JP 11-328453.
English language Abstract of JP 10-240969.
English language Abstract of JP 10-208090.
English language Abstract of JP 10-079056.
English language Abstract of JP 4-175991.
US 5,351,994, 10/1994, Pollin (withdrawn)

* cited by examiner

METHOD AND APPARATUS FOR FACILITATING MANUAL PAYMENTS FOR TRANSACTIONS CONDUCTED OVER A NETWORK

BACKGROUND OF THE INVENTION

1. Technical Field

The present invention pertains to systems for conducting transactions over a network. In particular, the present invention pertains to a system that conducts transactions (e.g., paying bills, sales of goods and/or services, etc.) over a network and enables users to tender payment manually (e.g., tender payment in the form of cash, check, etc.) for those transactions.

2. Discussion of Related Art

Generally, consumers engage in various transactions in order to obtain desired and/or necessary goods and/or services. These transactions typically require the consumer to travel to the physical site of the service and/or goods provider to conduct the transaction. For example, the consumer may travel to a retail establishment to purchase and tender payment for a desired item. Alternatively, services (e.g., utilities, banking services, credit cards, etc.) may be retained on a billing basis where consumers receive a billing statement periodically that indicates an account balance and requests payment for the retained services. The consumer may tender or remit payment for the above-described transactions in various forms. For example, payment may be mailed to a creditor or provider within a reasonable period after receiving a billing statement, or a credit card or cash may be presented to a provider at provider designated locations (e.g., provider office, retail establishment offering the item or service for sale, etc.). In addition, consumers may tender payment for particular transactions (e.g., paying bills) to agents residing at varying locations (e.g., retail establishments, malls, grocery stores, etc.) and affiliated with various creditors and/or providers. These agents generally process received consumer payments in order to provide a consolidated payment to each creditor and/or provider for corresponding consumer transactions. The agents generally tender payment to the creditors and/or providers in the form of a check, or provide a file of consumer payment information to the creditors and/or providers and tender payment in the form of electronic funds transfer. However, these manners of conducting and remitting payment for transactions tend to become cumbersome. Further, consumer payments received by the agents typically require various processing to determine the consolidated payment or sophisticated electronic formatting in batch mode to provide the consumer payment file in a desired file format (e.g., CIE, CIX, EDI). This tends to create delays for the transaction to be processed, while producing various payment rejections during transaction processing due to inconsistent account information.

The related art has attempted to overcome these problems by providing various systems that facilitate performance of consumer transactions remotely. For example, International Publication No. WO 01/16768 (Sosa et al) discloses an online purchase system that provides a universally accessible, anonymous and secure online payment option for consumers. A user pays cash and receives a serial number. The serial number may be imprinted on a cash card or the like for convenience. The user accesses an online proxy system using the serial number, thereby establishing a cash account and allowing the user to conduct online transactions using that account. The proxy system includes at least one universally accepted charge account that is used to conduct transactions on behalf of the user. The user surfs the Internet for goods and services of online merchants. The user selects items to purchase and indicates the desire to purchase the selected items by selecting or interfacing a buy button or the like. The proxy system intercepts the purchase request, compares the user's account balance with the total purchase amount to verify sufficient finds, adjusts the account balance if there are sufficient funds, and populates a purchase page from the merchant with valid charge account information to complete the purchase. The cash cards may be dispensed at a currency receiving vending machine, a dispensing unit or the like.

International Publication No. WO 01/11515 (Doherty et al.) discloses a system to make electronic payments on the Web. This system provides anonymity, security and accountability. A prepaid stored value card including a cash card identification number for a predetermined amount of money may be purchased at a point-of-sale. A user visits a web merchant, selects an item to purchase and enters the cash card identification number and a personal security code to transmit for confirmation to the server. The server subtracts the cost of the item from the predetermined amount on the cash card.

U.S. Pat. No. 6,058,381 (Nelson) discloses a payment system suitable for network transactions in merchandise between purchasers and vendors. The system employs the services of guarantors which issue vouchers for payment. The vendors offer the merchandise on the network as URLs which optionally may include a URL address separated from a URL request. The URL or the URL address initially includes the network address of the guarantor and specifies particular merchandise. In response to selecting the URL, the purchaser is initially taken to the guarantor where the voucher is placed into the URL or the URL request, while the network address of the vendor is placed into the URL or the URL address. The purchaser is then redirected to the vendor where the voucher is accepted as payment before the vendor releases the merchandise for communication over the network to the purchaser.

U.S. Pat. No. 5,699,528 (Hogan) discloses a bill delivery and payment system where users are able to access a server computer on a communications network to obtain bill information and pay bills. The communications network may be the Internet or World Wide Web. A user may access a web site provided by the server computer via a personal computer to view the bill information and to instruct the server computer as to the details of the bill payment.

U.S. Pat. No. 5,943,656 (Crooks et al) discloses a computerized billing and payment authorization system. A host system includes a database in which information associated with a billable entity from which payment is to be received is stored. Billing information is received from a billing entity and is associated with a bill for payment by the billable entity. The billable entity is provided with remote electronic access to the billing information in the host computer and can authorize payment thereof. In one implementation, the billing information is scrutinized in accordance with predetermined tolerance parameters prior to the billable entity gaining access thereto. In another implementation, a plurality of billing entities provide billing information to the host system, with the billing information being subsequently checked and consolidated into a consolidated amount which can be remotely accessed by the billable entity. In a preferred implementation, a plurality of utility providers are incorporated into the system and provide billing information for customers which may have a number of different, geographically-separated sites being serviced by different utilities. The billing information is consolidated and made available electronically through access which is initiated by the customer. The systems and methodologies are preferably implemented in connection with a multiuser computer network, such as the Internet.

U.S. Pat. No. 5,825,881 (Colvin, Sr.) discloses a system for conducting commerce over a large public network, such as the Internet. The system facilitates communications between a merchant, a customer and a bank or credit card processor. In particular, the customer may select products to purchase by accessing a merchant's web site and clicking on one or more links that place the products in a virtual shopping cart. The customer then clicks a checkout link that causes an itemized price list to be downloaded to the customer's computer. Once downloaded, this information is merged with information locally stored on a customer's computer. The customer's computer then adds sales tax information and sends this information along with a shipping address back to the merchant. Credit card information from the customer is sent directly to the financial institution such that the merchant never receives the customer's credit card information. The financial institution informs the merchant that the transaction is complete.

The above-described systems of the related art suffer from several disadvantages. In particular, the related art systems tend to require the use of pre-existing monetary or credit card accounts to conduct transactions remotely (i.e., over the Internet), thereby limiting manners of facilitating consumer payment and restricting use of the systems to consumers that can establish the required accounts. Further, various web sites may utilize different and independent accounts to conduct transactions. Thus, the consumer is provided with the cumbersome tasks of managing several accounts and correlating each account with the appropriate web site in order to conduct transactions. Moreover, the related art systems generally require users to have access to personal computers or other devices in order to facilitate performance of the transactions, thereby limiting system availability to a reduced consumer base. The related art systems accepting payment via credit cards tend to expose a consumer to the risk of finance charges and/or accumulation of debt. These systems further transfer consumer financial information between remote systems communicating over the Internet in order to complete a transaction, thereby exposing that information to interception by illegitimate parties for unjust gain. In addition, consumer payment and other information utilized to conduct transactions is typically stored by the related art systems, thereby infringing upon consumer privacy.

OBJECTS AND SUMMARY OF THE INVENTION

Accordingly, it is an object of the present invention to facilitate tender of payment manually (e.g., tender of payment in the form of cash, check, etc.) for transactions conducted over a network.

It is another object of the present invention to conduct transactions over a network while maintaining consumer anonymity and privacy.

Yet another object of the present invention is to enable consumers without possession of a computer system to conduct transactions over a network.

The aforesaid objects are achieved individually and/or in combination, and it is not intended that the present invention be construed as requiring two or more of the objects to be combined unless expressly required by the claims attached hereto.

According to the present invention, a system enables a customer to tender payment manually (e.g., tender payment in the form of cash, check, etc.) for transactions conducted over a network (e.g., the Internet). The system includes one or more computer systems each located at a corresponding agent site and a server computer system disposed remote from the agent systems. The server computer system is in communication, via the network, with the agent computer systems and one or more merchant computer systems facilitating performance of transactions. Selection of a transaction and navigation of the network is facilitated by the agent and server systems, respectively.

A consumer or customer typically travels to an agent site and tenders payment, preferably manually (e.g., tenders payment in the form of cash, check, etc.), in order to conduct a transaction (e.g., pay a bill, purchase an item, etc.) over the network. Specifically, a desired transaction is selected and entered into the agent system located at that agent site for transference to the server computer system. The server computer system accesses the appropriate merchant network or web site hosted on a merchant computer system in response to selection information received from the agent system, and translates accessed merchant web pages for transmission to the agent system. In particular, the server computer system accesses the particular merchant computer system and corresponding merchant web site containing the selected transaction and determines the appropriate information required to conduct that transaction. The server computer system informs the agent system of the information required for the transaction, while the information and manual payment is received from the customer at the agent site. The server computer system receives the required information from the agent system and processes the transaction information for transference to the merchant computer system hosting the particular merchant web site. In addition, the server computer system enters information relating to a corporate credit card account of a provider of the transaction service within the transaction payment information for transference to the merchant system in order to tender payment for the network transaction. The agent system generates a receipt for the customer in response to receiving confirmation from the merchant system, via the server computer system, that the selected transaction has been processed. The transaction information may be utilized by the merchant system to update any consumer account or other balances relating to the processed transaction.

The present invention provides several advantages. For example, the present invention enables transactions to be conducted over a network without the need for customers or provider agents to utilize credit, debit or smart cards. Thus, the present invention provides network transaction capabilities to consumers without possession of these types of cards, financial accounts or computer systems, thereby expanding service and/or goods provider accessibility to consumers. This feature of the present invention further simplifies the transaction for customers and/or provider agents since transactions may be conducted with reduced data entry (e.g., entry of financial card information is not required by the agent system for the transaction). Further, the present invention processes transactions upon entry into the system, thereby minimizing the time delay for a transaction to be processed. This feature further enhances resolution of transactions rejected during processing since these transactions may be immediately modified and re-submitted. Moreover, the present invention incurs lower operating costs due to reduced processing and performance of transactions without bank intervention and corresponding banking fees (e.g., for electronic funds transfer, etc.), thereby facilitating reduced transaction costs to consumers. In addition, the present invention enhances reliability with respect to transaction processing.

DETAILED DESCRIPTION OF THE PREFERRED EMBODIMENTS

Figure 1:
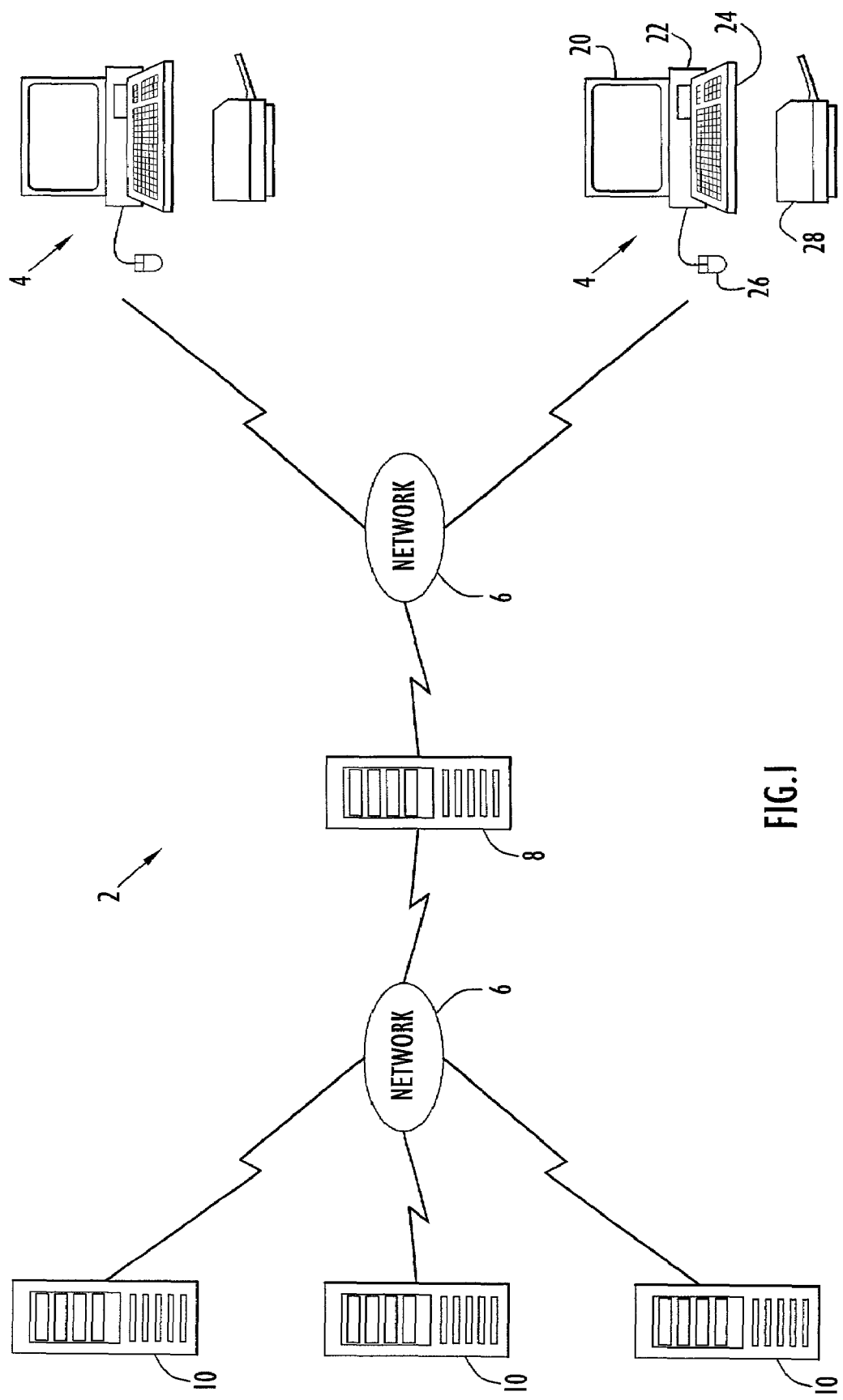
FIG. 1 is a schematic diagram of a system for facilitating tender of payments manually for transactions conducted over a network according to the present invention.

A system for facilitating tender of payments manually (e.g., tender of payments in the form of cash, check, etc.) by consumers or customers for transactions conducted over a network according to the present invention is illustrated in FIG. 1. Specifically, system 2 includes agent computer systems 4, transaction server system 8 and merchant server systems 10. Transaction system 8 is in communication with the agent and merchant systems via a network 6 (e.g., the Internet). Transaction system 8 serves as an interface or transaction manager and transfers transaction information between the agent and merchant systems. Agent systems 4 typically reside at different remote or agent sites (e.g., local retail establishments, etc.), while transaction system 8 typically resides at a site remote from the agent systems and facilitates performance of transactions (e.g., pay various obligations (e.g., bills, parking ticket, child support, etc.), purchase goods and/or services, etc.) with merchant systems 10 as described below. The merchant systems are associated with merchants or providers of goods and/or services and are generally located at sites remote from each other and the transaction and agent systems. The transaction system basically receives a request for performance of a selected transaction from an agent system 4, and accesses the appropriate web site hosted on the particular merchant system that facilitates performance of the selected transaction. The transaction system processes pages of the web site to determine the information required for the selected transaction and requests the information from the agent system. The agent system receives the requested information from a customer and transfers the requested information to the transaction system for transference to the merchant system. A customer tenders payment for the selected transaction manually (e.g., tenders payment in the form of cash, check, etc.) at the agent site, while transaction system 8 transfers the requested information and payment information of a provider of the transaction service to the merchant system in order to complete the selected transaction. A receipt is generated for the customer by the agent system in response to receiving from the transaction system transaction confirmation information generated by the merchant system. By way of example only, system 2 includes two agent systems 4, a transaction system 8 and three merchant systems 10, however, the system may include any quantity of agent, transaction and merchant systems.

Agent system 4 is typically implemented by a conventional IBM-compatible or other type of personal computer or processing system (e.g., lap top, desktop, PDA, modified point of sale or credit card terminals, etc.) preferably equipped with a monitor 20, a base 22 (e.g., including the processor, memories, and internal or external communication devices or modems), keyboard 24 and an optional mouse 26 or other input device (e.g., voice recognition, etc.). Agent system 4 includes the appropriate software to perform transaction processing and communicate with transaction system 8 (e.g., transaction software, Internet Browser (e.g., Microsoft Internet Explorer 5.0), etc.), and appropriate components (e.g., processor, disk storage or hard drive, etc.) having sufficient processing and storage capabilities to effectively execute the software. The agent system preferably employs a Windows 95/98 operating system, however, any of the major platforms or operating systems (e.g., Windows, Macintosh, Unix, Linux, DOS, OS2, etc.) may be utilized. The agent system preferably includes at a minimum an Intel or equivalent processor and an appropriate amount of RAM to effectively execute the software. The agent system typically includes a printer 28 for printing various documents relating to a transaction and may further include any additional hardware, software or peripherals (e.g., voice recognition, scanner, etc.) to assist in performing the transaction. Alternatively, agent system 4 may be disposed within a kiosk or other structure for use by customers and include mechanisms to receive and disburse payment in the form of cash, checks or other instruments. The kiosk may be located at various sites (e.g., retail stores, malls, etc.) to facilitate tender of payment manually (e.g., tender of payment in the form of cash, check, etc.) for transactions conducted over network 6 in the manner described below.

The transaction and merchant server systems are each typically implemented by a conventional personal or other suitable computer or server system preferably equipped with a base (e.g., including the processor, memories and internal or external communication devices (e.g., modem, network cards, etc.)) and optional display and input devices (e.g., keyboard, mouse, etc.). The transaction system includes software (e.g., server software (e.g., Internet Information Server 5), transaction processing software, a data storage management or database system, etc.) to communicate with agent systems 4 and merchant systems 10 and process transaction information, while the merchant system includes software (e.g., server software, merchant transaction software, etc.) to communicate with the transaction server and process transactions. The transaction and merchant systems include appropriate components (e.g., processor, disk storage or hard drive, etc.) having sufficient processing and storage capabilities to effectively execute the software. The transaction system preferably employs a Windows 2000 operating system, however, the transaction and merchant systems may utilize any of the major platforms or operating systems. The transaction processing software of the transaction system may be implemented in a variety of computing languages (e.g., Active Server pages, HTML, DHTML and XML) and enables the transaction system to serve as an interface between merchant systems 10 and agent systems 4 as described below. The transaction system, under software control, basically implements the present invention system ski for facilitating tender of payments manually for transactions conducted over a network.

Figure 2:
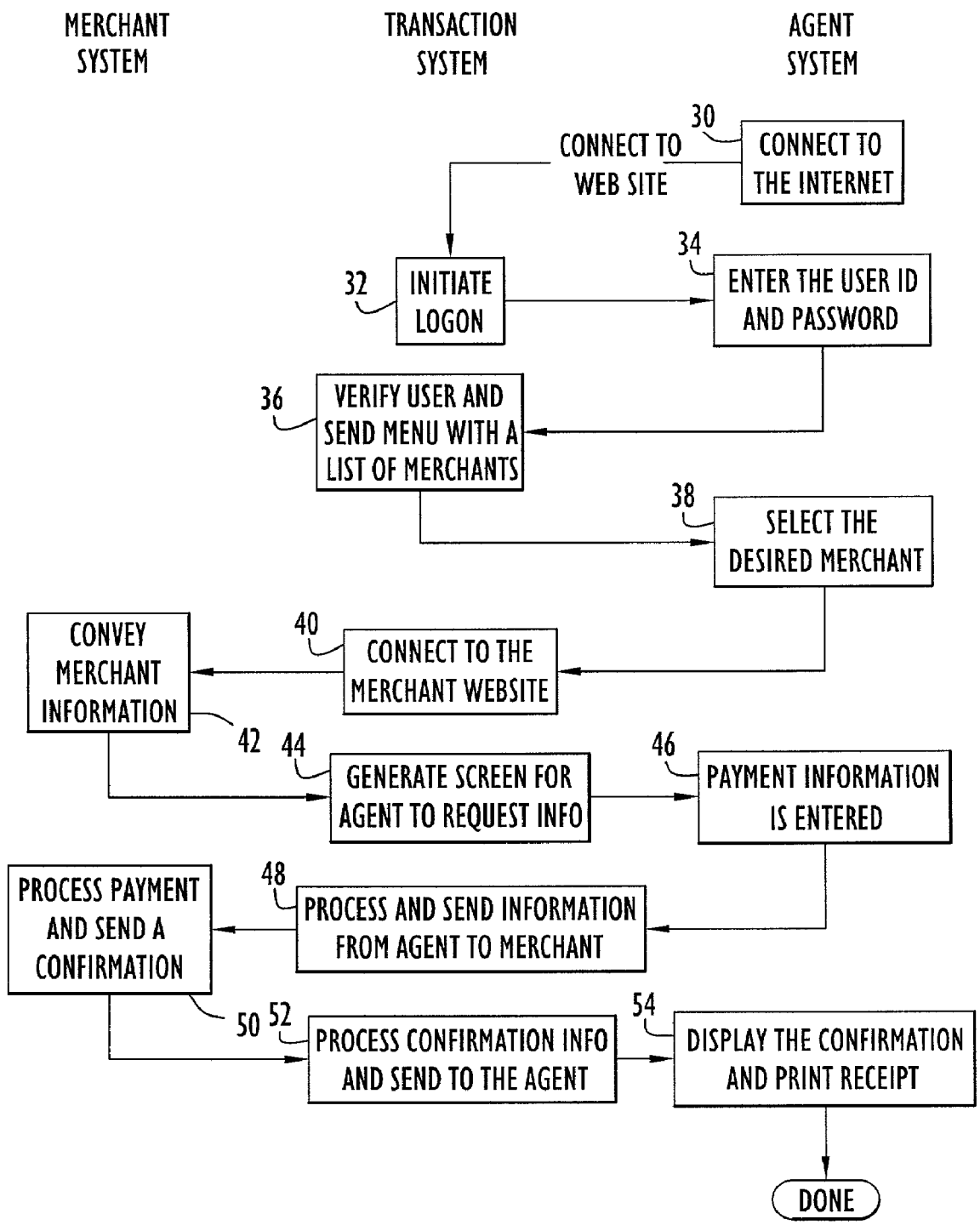
FIG. 2 is a procedural flowchart illustrating the manner in which the system of FIG. 1 facilitates tender of payments manually for transactions conducted over a network according to the present invention.

The manner in which system 2 conducts a transaction over network 6 according to the present invention is illustrated in FIG. 2. Initially, a customer travels to an agent site (e.g., a retail establishment, commercial enterprise, location with public access, mall, etc.) where an agent system 4 resides in order to conduct a transaction. The customer travel may be prompted by receipt of a billing statement from a creditor or provider affiliated with the transaction service provider or by the customer's desire to conduct other consumer transactions (e.g., purchase items, etc.) with affiliated merchants. A transaction service provider agent typically operates the agent system and receives payment for the transaction as described below. The customer may alternatively operate the agent system when accessible via the kiosk. The agent system accesses network 6 (e.g., via an Internet Service Provider (ISP)) and initiates a connection to transaction system 8 at step 30. Agent system 4 typically stores the network address or Uniform Resource Locator (URL) of the transaction system, and utilizes that address to initiate a connection to the transaction system. Alternatively, the transaction service provider agent or customer may enter a network or electronic mail (e-mail) address or URL of the transaction system within an agent system browser or other communication software to initiate the connection.

Transaction system 8 initially responds to agent system 4 at step 32 by verifying that the transaction service provider agent or agent system is permitted to utilize the system. In particular, the transaction system transmits to the agent system an initial web page requesting a user identification and password. The web page is displayed by the agent system, while the requested information is entered into appropriate fields provided on the display at step 34 via keyboard 24 (FIG. 1), mouse 26 and/or other input device (e.g., voice recognition). The entered information is subsequently transmitted to transaction system 8 in response to actuation of a web page button via mouse 26 or other input device. Alternatively, the agent system may store the verification information and automatically provide that information within the displayed web page or directly to the transaction system. The information is received by transaction system 8 and verified at step 36 against verification or user information previously stored by the transaction system. Once the agent and/or agent system is verified, transaction system 8 transmits to agent system 4 a list of merchants and/or corresponding transaction options. The list is displayed by the agent system and the customer selects an option at step 38. Agent system 4 conveys the selection to transaction system 8 to facilitate performance of the selected transaction.

Figure 3:
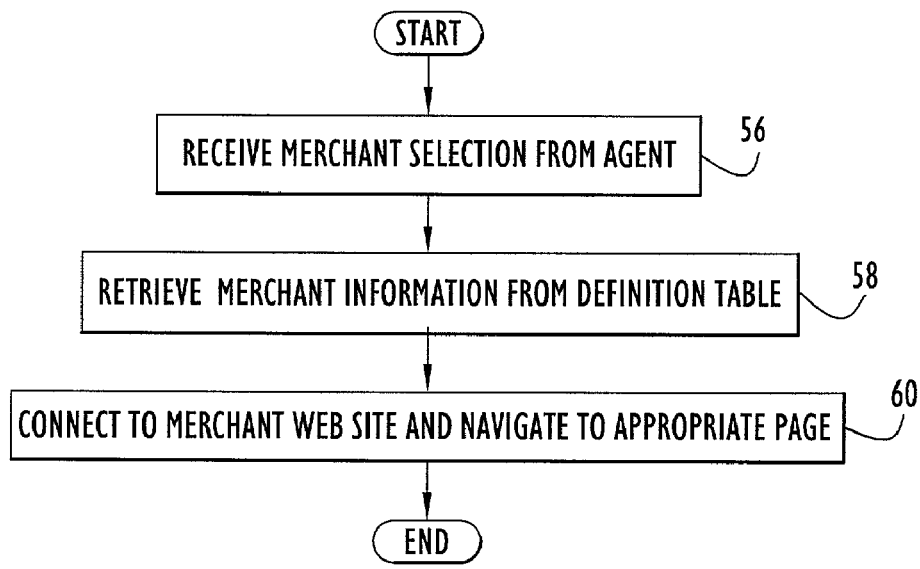
FIG. 3 is a procedural flowchart illustrating the manner in which a connection is established between the transaction and merchant server systems.

Transaction system 8 receives the selected transaction and establishes a connection to the merchant system associated with that transaction at step 40. This process is further described with reference to FIG. 3. Specifically, transaction system 8 receives information associated with the selected transaction from agent system 4 at step 56. The received information is processed to determine the particular merchant involved in the selected transaction. Once the merchant is determined, information relating to the determined merchant is retrieved from a definition table at step 58. The definition table may be implemented by a database or other data storage structure (e.g., file, data structure, etc.) and contains information to facilitate a connection to the merchant system associated with the determined merchant. The definition table typically includes merchants and corresponding network addresses or URLs of network sites associated with those merchants. The transaction system accesses the definition table to retrieve the network address or URL of the merchant system and/or web site associated with the determined merchant. The retrieved network address or URL is utilized by the transaction system at step 60 to establish a connection to the merchant system associated with the selected transaction and navigate to the appropriate site or web page for that transaction.

Figure 4:
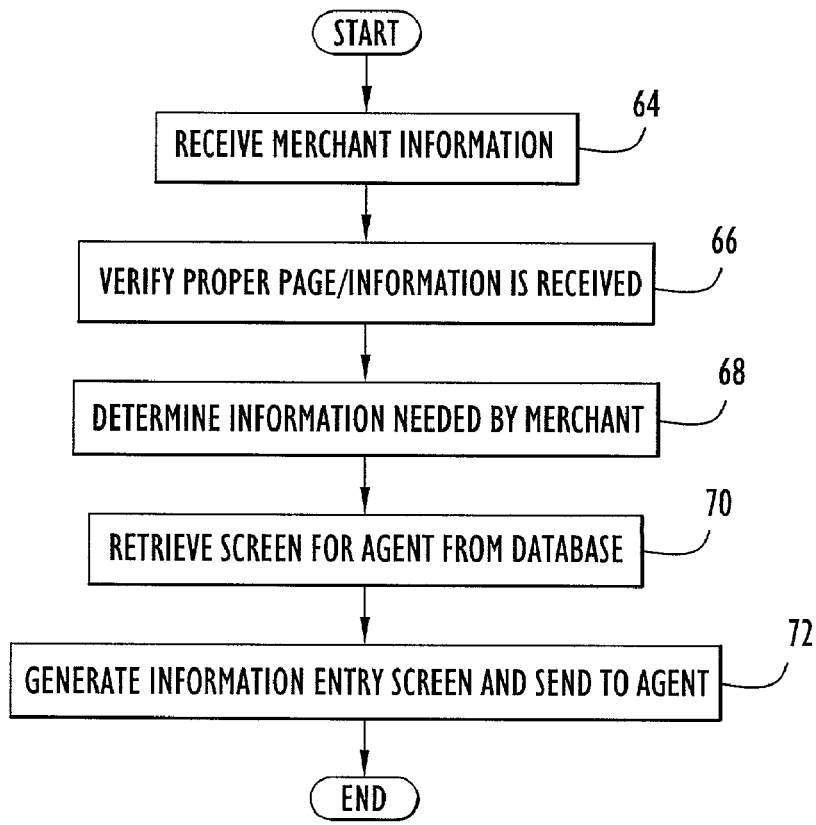
FIG. 4 is a procedural flow chart illustrating the manner in which the transaction system processes information received from the merchant system for transference to the agent system.

Referring back to FIG. 2, the merchant system retrieves and transmits the web page for the selected transaction to transaction system 8 at step 42. The transaction system processes the information received from the merchant system and conveys an information request to agent system 4 at step 44. This process is further described with reference to FIG. 4. Specifically, the information transmitted from the merchant system is received by transaction system 8 at step 64. The transaction system verifies that the proper web page and/or information for the selected transaction is received from the merchant system at step 66. The verification is generally accomplished by examining the fields within the code (e.g., HTML, DHTML, XML, etc.) implementing the web page for information relating to the selected transaction. The transaction system further examines the web page code at step 68 to determine information required by that page to conduct the selected transaction. An entry screen or web page is retrieved from a database at step 70 and configured (e.g., the code (e.g., HTML, DHTML, XML, etc.) implementing the entry screen or web page is modified) to request the appropriate information for the selected transaction at step 72. Basically, the entry screen includes fields to receive the appropriate information where each field is associated with an identifier to indicate the corresponding location or field for the requested information within the merchant web page. The entry screen is generated to exclude fields requesting payment information. Alternatively, the transaction system may form the entry screen by modifying the web page received from the merchant system (e.g., modifying the code implementing the web page) to exclude payment information. The entry screen may further include promotional ads or other information and is transmitted to the agent system for display.

Referring back to FIG. 2, agent system 4 receives the entry screen and displays that screen on monitor 20 (FIG. 1). The entry screen is preferably displayed via the agent system browser in substantially the same manner utilized to display web pages. The information requested by the entry screen is entered into the agent system at step 46 by either the transaction service provider agent or the customer as described above. The entry screen typically requests various information from the customer and may be arranged in any desired fashion. By way of example only, the entry screen may request information relating to customer name, customer address, customer telephone number, customer account information (e.g., in relation to paying a bill) or any other desired information. The requested information may be entered into the agent system in various manners. For example, the transaction service provider agent or customer may enter the requested information into the agent system via keyboard 24 and/or mouse 26, or the agent system may include voice recognition features to receive the information in the form of voice signals. Further, the agent system may include a scanner to scan a customer card (e.g., drivers license or other identification) to retrieve requested information. The scanner may be of the type utilized with bar codes or employ optical character recognition (OCR) to retrieve the requested information (e.g., name, address, etc.). Moreover, the scanner may be utilized to scan a customer billing statement to retrieve customer information (e.g., name, address, account information, etc.) for paying bills. In addition, the agent system may store customer information locally where entry of an initial field of information (e.g., name, telephone number, etc.) enables the agent system to retrieve customer information for the remaining fields from the stored information. This is typically utilized for repeat customers and reduces the amount of data entry required to conduct a transaction.

The entry request screen typically further includes an amount field indicating the payment required for the transaction (e.g., the amount being tendered by the customer to pay a bill, the total amount of a purchase or bill, etc.). The payment amount generally includes a processing fee charged by the transaction service provider. This fee may be distributed in any desired manner among the agents, merchants and transaction service provider. The customer subsequently tenders payment manually (e.g., tenders payment in the form of cash, check, etc.) at the agent site. This may be accomplished by the customer tendering payment to the transaction service provider agent, or by the customer inserting the payment within a system payment accepting mechanism in the case where the agent system is operated by the customer and/or disposed within a kiosk. The agent may enter into the agent system the amount tendered, or the payment accepting mechanism may automatically determine the tendered amount, while the agent system generally indicates any underpayment by, or change due to, the customer. Change may be provided to the customer by the transaction service provider agent or by the payment accepting mechanism, while an underpayment causes the agent system to prompt for additional funds in order to facilitate the transaction. Alternatively, the payment amount may be determined and tendered at any point during commencement of the transaction.

Figure 5:
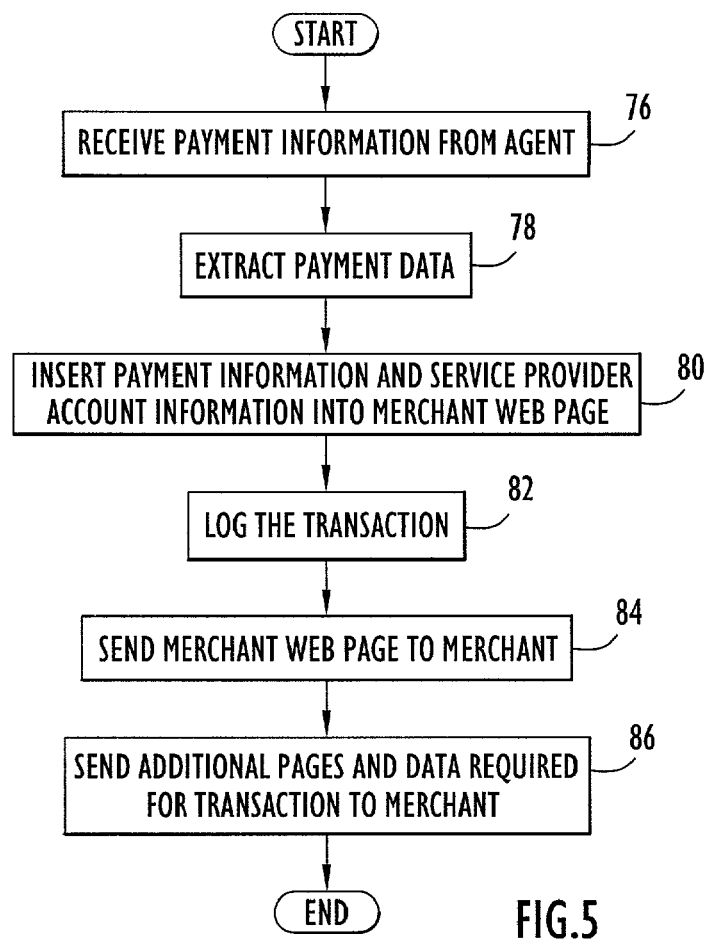
FIG. 5 is a procedural flow chart illustrating the manner in which the transaction system processes payment information received from the agent system for transference to the merchant system.

Once the information requested by the entry screen is entered, the entered information is transmitted from agent computer system 4 to transaction system 8. The transaction system processes the received information for transference to the merchant system at step 48. This process is further described with reference to FIG. 5. Initially, the transaction system receives the completed entry screen from agent system 4 at step 76. The information provided by the customer is extracted from the entry screen at step 78. The extracted information is inserted into the appropriate locations or fields of the merchant web page at step 80 in accordance with the field identifiers of the entry screen. In order to complete the transaction, payment information is further placed within the appropriate fields of the merchant web page by the transaction system. The payment information preferably includes information relating to a credit card account of the transaction service provider. However, the payment information may include any information of the transaction service provider that facilitates payment in any desired manner (e.g., bank by telephone, account and routing information for electronic funds transfer, etc.). The transaction system logs or records the transaction and corresponding information (e.g., transaction type, amount, merchant, etc.) in a database or other storage structure at step 82. The stored information is utilized by the transaction system to generate management or closeout reports (e.g., including aggregate amounts of transactions, quantity of transactions, etc. for a particular time interval (e.g., day, week, month, etc.)) and to perform audit processing (e.g., examine transactions, determine various aggregate amounts for time intervals, etc.). The merchant web page containing the inserted information is transmitted to the merchant system at step 84. In addition, the transaction system transmits any additional merchant web pages and information required for the transaction to the merchant system at step 86 to facilitate transaction processing.

Figure 6:
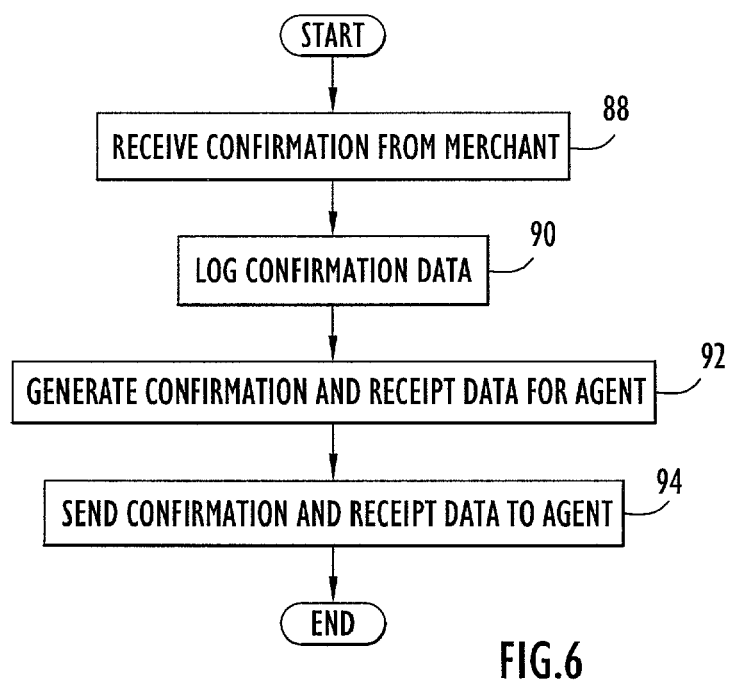
FIG. 6 is a procedural flow chart illustrating the manner in which the transaction system processes confirmation information received from the merchant system for transference to the agent system.

Referring back to FIG. 2, the merchant system receives the web pages and any additional transaction information from the transaction system and processes the transaction at step 50. This typically includes verifying customer and payment information, facilitating transfer of finds for payment of the transaction and updating customer account or other balances with the merchant. Once the transaction is processed, the merchant system transmits confirmation of the completed transaction to the transaction system. The transaction system receives and processes the confirmation at step 52 for transference to the agent system. This process is further described with reference to FIG. 6. Initially, the confirmation information (e.g., a confirmation number or identifier, date and time of transaction, amount tendered, merchant, etc.) transmitted by the merchant system is received by transaction system 8 at step 88. The confirmation information is logged or recorded in a database or other storage structure at step 90. This information may further be utilized to generate management or closeout reports and perform audit processing as described above. The transaction system processes the confirmation information to produce confirmed transaction information for the agent system at step 92. This information is transmitted to the agent system at step 94 and utilized to display the confirmation and print a transaction receipt for the customer as described below.

Referring back to FIG. 2, the agent computer system receives the confirmed transaction information and displays the confirmation on monitor 20 and further prints a receipt for the customer at step 54. The receipt may include various transaction information (e.g., date, time, amount tendered, type of transaction, merchant, confirmation identifier, etc.). The agent system may store various transaction information in a database or other storage structure to enable the agent system to generate management or closeout reports and perform audit processing as described above.

It will be appreciated that the embodiments described above and illustrated in the drawings represent only a few of the many ways of implementing a method and apparatus for facilitating manual payments for transactions conducted over a network.

The agent, transaction and merchant computer systems may be implemented by any quantity of any personal or other type of computer or processing system (e.g., IBM-compatible, Apple, Macintosh, laptop, palm pilot, PDA, modified point of sale or credit card terminals, etc.). The computer systems may include any commercially available operating system (e.g., Windows, OS/2, Unix, Linux, etc.) and any commercially available or custom software (e.g., server software, browser and/or other communication software, transaction software, transaction processing software, merchant transaction software, etc.). The computer systems may further include any types of input devices (e.g., keyboard, mouse, voice recognition, scanners, touch-screen, etc.), and be disposed at any desired sites either remote from or local to each other in any desired fashion. The agent computer systems may be configured in any manner and/or disposed in any suitable structure (e.g., kiosk, stand, etc.) for manned (e.g., an agent operates the agent system) or unmanned (e.g., customer operates the agent system) operation. The computer systems of the present invention may alternatively be implemented by hardware or other processing circuitry. The various functions of the computer systems may be distributed in any manner among each other, among any quantity of computer or processing systems or circuitry and/or among any quantity of software and/or hardware modules.

The network may be implemented by, and the computer systems may communicate via, any communications medium or network (e.g., LAN, WAN, Internet, Intranet, direct connection, e-mail, etc.). The agent, transaction and merchant computer systems may include any conventional or other communications devices to communicate over the network or other communications medium. The communications between the computer systems may be formatted or arranged in any desired fashion, and may further be encoded or encrypted in any manner for secure communications. The agent, transaction and merchant systems may directly or indirectly communicate with each other in any desired fashion.

The definition table and databases may be implemented by any quantity of conventional or other databases or storage structures (e.g., file, data structure, etc.), may be arranged in any fashion and may store any desired information. The definition table may associate the merchant address, URL or other information with any quantity of any desired information or keys (e.g., merchant name, telephone number, identifier or code, etc.).

It is to be understood that the software for the computer systems may be implemented in any desired computer language and could be developed by one of ordinary skill in the computer arts based on the functional descriptions contained in the specification and flow charts illustrated in the drawings. The software and/or algorithms described above and illustrated in the flow charts may be modified in any manner that accomplishes the functions described herein.

The transaction system may verify a user or agent system in any desired manner via any suitable information (e.g., identification and passwords, codes, keys, encryption, etc.). The verification may utilize any quantity of screens or pages that may be arranged in any fashion and request any desired information. The screens or pages may be transmitted to the transaction system in response to any desired actuation (e.g., screen button, keyboard, voice command, touch screen, etc.). The options list may include any quantity of any desired transactions or merchants or any other information, and may be arranged in any desired fashion. The list may be transmitted and/or displayed in any desired form (e.g., web page, menu, line prompt, etc.), while an option may be selected in any desired fashion (e.g., mouse, keyboard, voice recognition, touch screen, etc.) with any desired information being sent to the transaction system identifying the selected transaction (e.g., transaction identifier, merchant information, etc.). Alternatively, the consumer may search for a particular merchant, transaction or goods and/or services using key words. The searches may be performed by the transaction system or by a search engine (e.g., Lycos, Excite, Alta Vista, etc.) and enable a consumer to indicate a selection from the results list in order to facilitate a transaction in the manner described above.

The transaction system may receive and utilize any information to determine the particular merchant system for the selected transaction (e.g., transaction identifier indicating a particular merchant, merchant name, etc.) and to look up the merchant system or web site address in the definition table or other data storage structure. The transaction system may access the merchant web site and page in any desired manner and may verify web pages or other information received from a merchant system in any desired fashion (e.g., examine web page code, transfer and verification of web page identifiers, etc.). Further, the transaction system may examine any quantity of merchant web pages in any desired fashion in order to determine the information required for a transaction (e.g., examine code implementing web pages, the merchant system may provide an indication of the required information, etc.).

The transaction system database may include any quantity of entry screens or web pages for requesting information. The entry screens may be individually created by the transaction system in response to each transaction, may be pre-generated with particular fields where the transaction system retrieves the appropriate screen from the database based on the information required for the transaction, or may be pre-generated in generic form where a particular generic screen may be retrieved from the database and modified to request the transaction information. The entry screen may be arranged in any fashion, may include any quantity of fields and may include any desired information (e.g., request any information, include promotional ads, display any desired information, etc.). Further, the entry screen and other displays (e.g., verification pages, confirmation, etc.) may be implemented by windows, graphical user interfaces, line prompting or any other data entry and display techniques. Information may be entered within the entry screen via any suitable input device (e.g., touch screen, keyboard, mouse, voice recognition, scanner, etc.). The scanner may be of any type and may retrieve information from any type of card, statement or identification (e.g., billing statement, drivers license, credit card, membership card, etc.), wherein the scanned item may be printed or encoded in any manner capable of being read by any type of scanner utilized by the agent system for data entry. The completed entry screen may be transmitted to the transaction system in response to any desired actuation (e.g., screen button, keyboard, voice command, touch screen, etc.).

Payment may be tendered at any time during a transaction and in any desired fashion at the agent sites (e.g., cash, check or other negotiable instrument, credit, debit or smart card, etc.). Credit and other cards may be utilized to tender payments at the agent site, thereby obviating transmission of consumer financial card information over the network. The agent system may indicate any amount due, underpayment or overpayment for a transaction on the entry or other screen in any desired fashion, while the system may account for partial payments of bills or other transactions. The agent system may include any conventional or other mechanisms for accepting and/or disbursing payments (e.g., cash register, credit card or other terminal, automated acceptance and disbursing mechanisms, etc.) in any desired form (e.g., cash, check or other instruments, etc.).

The transaction system may extract information from the completed entry screen in any desired fashion. The entry screen fields may be associated with any desired identifiers and correspond to any desired fields in the merchant web page. Alternatively, the transaction system may correlate fields between the merchant web page and entry screen in any desired fashion (e.g., keys, tables, identifiers, etc.). The requested information may be inserted in the merchant web page in any desired fashion. Alternatively, the transaction information may be sent to the merchant system in any desired manner or arrangement (e.g., sent as a data block or packet without the web page, etc.). The transaction system may request any additional or desired information from the agent system in any manner or transmit any desired additional information or pages to the merchant system in order to conduct a transaction. The transaction system may insert into the merchant web page or transmit to the merchant system any desired payment information (e.g., credit or other card, bank routing number, etc.) of the transaction service provider or any other party in order to tender payment for the transaction.

The agent and transaction systems may generate any types of closeout or other reports at any suitable time interval or upon initiation by a user. The reports may include any desired information for any desired time interval and may be arranged in any desired fashion. The agent and transaction systems may store any desired information and may further perform any type of audit processing on the stored transaction information.

The merchant system may process the received transaction information in any desired fashion and perform any suitable transaction processing (e.g., verify finds and payment, update customer account or other balances, post the transaction, etc.). The merchant system may generate any type of confirmation information to confirm transaction processing. The confirmation information may include any desired information (e.g., any type of confirmation and/or transaction identifier, date, time, transaction type, merchant, transaction amount, etc.) and may be transmitted to the transaction system in any desired format. Alternatively, the confirmation information may be transmitted from the merchant system directly to the agent system via any communications medium. The transaction system may generate confirmation and receipt information in any desired format for transference to and display and printing by the agent system. The agent system may display any portion or the entirety of the confirmation information, and may display that information in any desired arrangement or fashion. The receipt information may include any desired information (e.g., confirmation and/or transaction identifier, date, time, transaction type, merchant, transaction amount, etc.). The agent system may print any portion or the entirety of the receipt information, while the receipt may include that information arranged in any desired fashion. The receipt may be sent to the customer in any desired manner (e.g., presented at the agent site, e-mail, ground mail, etc.). The various identifiers (e.g., field, transaction, confirmation, etc.) may include any quantity of any alphanumeric characters or other symbols.

The present invention is not limited to the specific applications disclosed herein, but may be utilized for any desired transactions (e.g., bill payment to various merchants/creditors (e.g., utilities, municipalities, government, credit card companies, etc.), purchase of goods and/or services, installment and/or loan payments, etc.).

From the foregoing description it will be appreciated that invention makes available a novel method and apparatus for facilitating manual payments for transactions conducted over a network, wherein a transaction server system is in communication with agent and merchant systems and serves as an interface or transaction manager to transfer transaction information between the agent and merchant systems in order to facilitate performance of a transaction with payment being tendered manually at a remote agent site.

Having described preferred embodiments of a new and improved method and apparatus for facilitating manual payments for transactions conducted over a network, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. A system for enabling customers to visit a remote site and conduct transactions over a network with one or more provider processing systems, wherein payment is manually tendered at said remote site by said customers for said transactions, said system comprising:

an agent processor, disposed at said remote site and accessing said network, configured to receive a customer selection of a desired business transaction conducted over said network with a particular provider processing system and customer transaction information and to process information associated with a customer payment receivable in forms including at least one of cash and a check and manually tendered by a customer at said remote site to a service provider to satisfy payment requirements of said customer selected transaction, while maintaining customer financial account information undisclosed to a transaction processor; and the transaction processor, in communication with said agent processor and said provider processing systems via said network, configured to receive said customer selection and customer transaction information from said agent processor and facilitate performance and completion of said customer selected transaction over said network with said particular provider processing system in response to said manual tender of said customer payment, said transaction processor including:

a communication module configured to access a web site of said particular provider processing system performing said customer selected transaction;

a transaction information module configured to examine said accessed web site to determine information required by said accessed web site to conduct said customer selected transaction and to transmit an information request to said agent processor requesting a portion of said required information, the portion of the required information not including customer financial account information; and a transaction performance module configured to receive said customer transaction information transmitted without any customer financial account information from said agent processor in response to said information request and to transmit said required information portion and payment information associated with said service provider to said particular provider processing system in order for said service provider to tender payment over said network for said customer to complete said transaction with said particular provider processing system in response to said manual tender of said customer payment indicated within said received customer transaction information.

2. The system of claim 1 wherein said transaction processor further includes:

a verification module to request verification information from said agent processor and to initiate transaction processing in response to verifying said verification information received from said agent processor.

3. The system of claim 2 wherein said transaction processor further includes a selection module to produce a list of transactions selectable by said customer for transference to said agent processor in response to said verification by said verification module.

4. The system of claim 1 wherein said communication module includes a connection module to process said customer selection and determine a network location of said particular provider processing system.

5. The system of claim 1 wherein said transaction processor further includes a site verification module to examine said accessed web site and verify that said accessed web site is associated with said customer selected transaction.

6. The system of claim 1 wherein said transaction information module includes:
   an examination module to determine information required by said accessed web site to conduct said customer selected transaction; and
   a request generation module to generate said information request in the form of an entry screen for display by said agent processor, wherein said entry screen includes fields to receive said required information portion.

7. The system of claim 6 wherein said transaction performance module includes:
   an extraction module to selectively retrieve said customer transaction information from said fields of said entry screen received from said agent processor;
   an insertion module to place said retrieved information in corresponding fields of said accessed web site; and
   a payment module to place said payment information within corresponding fields of said accessed web site in order to tender payment for said customer selected transaction.

8. The system of claim 1 wherein said transaction performance module includes a transaction storage module to store information relating to said customer selected transaction within a data storage unit.

9. The system of claim 1 wherein said transaction processor further includes:
   a confirmation module to receive confirmation information from said particular provider processing system in response to said particular provider processing system processing said customer selected transaction and to process said received confirmation information to produce confirmed transaction information for transference to said agent processor.

10. The system of claim 9 wherein said transaction processor further includes a confirmation storage module to store information relating to said confirmation information within a data storage unit.

11. The system of claim 9 wherein said agent processor includes:
   a confirmation display module to process said confirmed transaction information received from said transaction processor in order to display a confirmation that said customer selected transaction has been processed.

12. The system of claim 11 wherein said agent processor further includes:
   a receipt module to process said confirmed transaction information received from said transaction processor in order to produce a transaction receipt; and
   a printing device to generate said transaction receipt for said customer.

13. The system of claim 1 further comprising:
   a plurality of said agent processors with each agent processor disposed at a respective remote site to receive a customer selection of a desired transaction and customer transaction information and to process said customer payments manually tendered at said respective remote site;
   wherein said transaction processor is in communication with said agent processors and said provider processing systems via said network, and receives said customer selections and customer transaction information from said agent processors and facilitates performance of said customer selected transactions.

14. The system of claim 1 wherein said agent processor includes a scanner for scanning a customer item including said customer transaction information and transferring said customer transaction information relating to a corresponding customer payment from said customer item into said agent processor.

15. The system of claim 1 wherein a repeat customer visits said remote site to conduct a second transaction and tender a second payment, and said agent processor further includes a data retrieval module to retrieve customer transaction information associated with said repeat customer and stored in response to a prior transaction to reduce entry of said customer transaction information and facilitate processing of said second transaction.

16. The system of claim 1 wherein said agent processor further includes a voice responsive device to receive voice signals and facilitate processing of said customer selected transaction and payment by said agent processor in response to said voice signals.

17. The system of claim 1 wherein said agent processor is disposed at said remote site within a supporting structure.

18. The system of claim 17 wherein said supporting structure includes a kiosk.

19. The system of claim 1 wherein said network includes the Internet.

20. The system of claim 1 wherein said customer selected transaction includes payment of a bill.

21. The system of claim 1 wherein said payment information includes credit card information of said service provider.

22. A system for enabling customers to visit a remote site and conduct transactions over a network with one or more provider processing systems, wherein payment is manually tendered at said remote site by said customers for said transactions and said remote site includes an agent processor to receive a customer selection of a desired business transaction conducted over said network in real time with a particular provider processing system and customer transaction information and to process information associated with a customer payment receivable in forms including at least one of cash and a check and manually tendered by a customer at said remote site to a service provider to satisfy payment requirements of said customer selected transaction, while maintaining customer financial account information undisclosed to a transaction processor, said system comprising:
   the transaction processor, in communication with said agent processor and said provider processing systems via said network, configured to receive said customer selection and customer transaction information from said agent processor and to facilitate performance and completion of said customer selected transaction over said network with said particular provider processing system in response to said manual tender of said customer payment, said transaction processor including:

a communication module configured to access a web site of said particular provider processing system performing said customer selected transaction;

a transaction information module configured to examine said accessed web site to determine information required by said accessed web site to conduct said customer selected transaction and to transmit an information request to said agent processor requesting a portion of said required information, the portion of the required information not including customer financial account information; and a transaction performance module configured to receive said customer transaction information transmitted without any customer financial zccount information from said agent processor in response to said information request and to transmit said required information portion and payment information associated with said service provider to said particular provider processing system in order for said service provider to tender payment over said network for said customer to complete said transaction with said particular provider processing system in response to said manual tender of said customer payment indicated within said received customer transaction information.

23. The system of claim 22 wherein said transaction information module includes:

an examination module to determine information required by said accessed web site to conduct said customer selected transaction; and a request generation module to generate said information request in the form of an entry screen for display by said agent processor, wherein said entry screen includes fields to receive said required information portion.

24. The system of claim 23 wherein said transaction performance module includes:

an extraction module to selectively retrieve said customer transaction information from said fields of said entry screen received from said agent processor;

an insertion module to place said retrieved information in corresponding fields of said accessed web site; and a payment module to place said payment information within corresponding fields of said accessed web site in order to tender payment for said customer selected transaction.

25. The system of claim 22 wherein said transaction processor further includes:

a confirmation module to receive confirmation information from said particular provider processing system in response to said particular provider processing system processing said customer selected transaction and to process said received confirmation information to produce confirmed transaction information for transference to said agent processor.

26. The system of claim 22 wherein a plurality of said agent processors are each disposed at a respective remote site to receive a customer selection of a desired transaction and customer transaction information and to process said customer payments manually tendered at said respective remote site;

wherein said transaction processor is in communication with said agent processors and said provider processing systems via said network, and receives said customer selections and customer transaction information from said agent processors and facilitates performance of said customer selected transactions.

27. The system of claim 22 wherein said network includes the Internet.

28. The system of claim 22 wherein said customer selected transaction includes payment of a bill.

29. The system of claim 22 wherein said payment information includes credit card information of said service provider.

30. A method of enabling customers to visit a remote site and conduct transactions over a network with one or more provider processing systems, wherein payment is manually tendered at said remote site by said customers for said transactions, said method comprising:

(a) receiving a customer selection of a desired business transaction conducted over said network with a particular provider processing system and customer transaction information and processing information associated with a customer payment receivable in forms including at least one of cash and a check and manually tendered by a customer at said remote site to a service provider to satisfy payment requirements of said customer selected transaction via an agent processor disposed at said remote site and accessing said network, while maintaining customer financial account information undisclosed to a transaction processor; and (b) receiving said customer selection and customer transaction information from said agent processor and facilitating performance and completion of said customer selected transaction over said network with said particular provider processing system in response to said manual tender of said customer payment via the transaction processor in communication with said agent processor and said provider processing systems via said network, wherein (b) further includes:

(b.1) accessing a web site of said particular provider processing system performing said customer selected transaction;

(b.2) examining said accessed web site to determine information required by said accessed web site to conduct said customer selected transaction and to transmit an information request to said agent processor requesting a portion of said required information, the portion of the required information not including customer financial account information; and (b.3) receiving said customer transaction information transmitted without any customer financial account information from said agent processor in response to said information request and transmitting said required information portion and payment information associated with said service provider to said particular provider processing system in order for said service provider to tender payment over said network for said customer to complete said transaction with said particular provider processing system in response to said manual tender of said customer payment indicated within said received transaction information.

31. The method of claim 30 wherein step (b.1) further includes:

(b.1.1) requesting verification information from said agent processor to initiate transaction processing in response to verifying said verification information received from said agent processor.

32. The method of claim 31 wherein step (b.1) further includes: (b.1.2) producing a list of transactions selectable by said customer for transference to said agent processor in response to said verification.

33. The method of claim 30 wherein step (b.1) further includes:
   (b.1.1) processing said customer selection and determining a network location of said particular provider processing system.
34. The method of claim 30 wherein step (b.2) further includes:
   (b.2.1) examining said accessed web site and verifying that said accessed web site is associated with said customer selected transaction.
35. The method of claim 30 wherein step (b.2) further includes:
   (b.2.1) determining information required by said accessed web site to conduct said customer selected transaction; and
   (b.2.2) generating said information request in the form of an entry screen for display by said agent processor, wherein said entry screen includes fields to receive said required information portion.
36. The method of claim 35 wherein step (b.3) further includes:
   (b.3.1) selectively retrieving said customer transaction information from said fields of said entry screen received from said agent processor;
   (b.3.2) placing said retrieved information in corresponding fields of said accessed web site; and
   (b.3.3) placing said payment information within corresponding fields of said accessed web site in order to tender payment for said customer selected transaction.
37. The method of claim 30 wherein step (b.1) further includes:
   (b.1.1) storing information relating to said customer selected transaction within a data storage unit.
38. The method of claim 30 wherein step (b) further includes:
   (b.4) receiving confirmation information from said particular provider processing system in response to said particular provider processing system processing said customer selected transaction and processing said received confirmation information to produce confirmed transaction information for transference to said agent processor.
39. The method of claim 38 wherein step (b) further includes:
   (b.5) storing information relating to said confirmation information within a data storage unit.
40. The method of claim 38 further including:
   (c) processing said confirmed transaction information received from said transaction processor, via said agent processor, in order to display a confirmation that said customer selected transaction has been processed.
41. The method of claim 40 wherein said agent processor includes a printing device, and step (c) further includes:
   (c.1) processing said confirmed transaction information received from said transaction processor in order to produce a transaction receipt; and
   (c.2) generating said transaction receipt for said customer via said printing device.
42. The method of claim 30 wherein a plurality of said agent processors are each disposed at a respective remote site and said transaction processor is in communication with said agent processors and said provider processing systems via said network, and wherein step (a) further includes:
   (a.1) receiving customer selections of desired transactions and customer transaction information and processing said customer payments manually tendered at said respective remote sites via said agent processors; and
   step (b) further includes receiving said customer selections and customer transaction information from said agent processors and facilitating performance of said customer selected transactions via said transaction processor.
43. The method of claim 30 wherein said agent processor includes a scanner, and step (a) further includes:
   (a.1) scanning a customer item including said customer transaction information and transferring said customer transaction information relating to a corresponding customer payment from said customer item into said agent processor via said scanner.
44. The method of claim 30 wherein a repeat customer visits said remote site to conduct a second transaction and tender a second payment, and step (a) further includes:
   (a.1) retrieving customer transaction information associated with said repeat customer and stored in response to a prior transaction to reduce entry of said customer transaction information and facilitate processing of said second transaction.
45. The method of claim 30 wherein said agent processor further includes a voice responsive device, and step (a) further includes:
   (a.1) receiving voice signals, via said voice responsive device, and facilitating processing of said customer selected transaction and payment by said agent processor in response to said voice signals.
46. The method of claim 30 wherein said agent processor is disposed within a kiosk.
47. The method of claim 30 wherein said network includes the Internet.
48. The method of claim 30 wherein said customer selected transaction includes payment of a bill.
49. The method of claim 30 wherein step (b.3) further includes:
   (b.3.1) receiving said customer transaction information from said agent processor in response to said information request and transmitting said required information portion and payment information including credit card information of said service provider to said particular provider processing system in order to conduct said transaction.
50. A system for enabling customers to visit a remote site and conduct transactions over a network with one or more provider processing systems, wherein payment is manually tendered at said remote site by said customers for said transactions and said remote site includes agent processing means configured to receive a customer selection of a desired business transaction conducted over said network with a particular provider processing system and customer transaction information and to process information associated with a customer payment receivable in forms including at least one of cash and a check and manually tendered by a customer at said remote site to a service provider to satisfy payment requirements of said customer selected transaction, while maintaining customer financial account information undisclosed to a transaction processing means, said system comprising:
   the transaction processing means, in communication with said agent processing means and said provider processing systems via said network, configured to receive said customer selection and customer transaction information from said agent processing means and facilitating performance and completion of said customer selected transaction over said network with said particular provider processing system in response to said manual tender of said customer payment, said transaction processing means including:
communication means configured to access a web site of said particular provider processing system performing said customer selected transaction;
transaction information means configured to examine said accessed web site to determine information required by said accessed web site to conduct said customer selected transaction and to transmit an information request to said agent processing means requesting a portion of said required information, the portion of the required information not including customer financial account information; and
transaction performance means configured to receive said customer transaction information transmitted without any customer financial account information from said agent processing means in response to said information request and to transmit said required information portion and payment information associated with said service provider to said particular provider processing system in order for said service provider to tender payment over said network for said customer to complete said transaction with said particular provider processing system in response to said manual tender of said customer payment indicated within said received customer transaction information.

51. The system of claim 50 wherein said transaction information means includes:
examination means for determining information required by said accessed web site to conduct said customer selected transaction; and
request generation means for generating said information request in the form of an entry screen for display by said agent processing means, wherein said entry screen includes fields to receive said required information portion.

52. The system of claim 51 wherein said transaction performance means includes:
extraction means for selectively retrieving said customer transaction information from said fields of said entry screen received from said agent processing means;
insertion means for placing said retrieved information in corresponding fields of said accessed web site; and
payment means for placing said payment information within corresponding fields of said accessed web site in order to tender payment for said customer selected transaction.

53. The system of claim 50 wherein said transaction means further includes:
confirmation means for receiving confirmation information from said particular provider processing system in response to said particular provider processing system processing said customer selected transaction and for processing said received confirmation information to produce confirmed transaction information for transference to said agent processing means.

54. The system of claim 53 wherein said agent processing means includes:
agent confirmation means for processing said confirmed transaction information received from said transaction means in order to display a confirmation that said customer selected transaction has been processed.

55. The system of claim 54 wherein said agent processing means further includes:
receipt means for processing said confirmed transaction information received from said transaction means in order to produce a transaction receipt; and
printing means for generating said transaction receipt for said customer.

56. The system of claim 50 wherein a plurality of said agent processing means are each disposed at a respective remote site to receive a customer selection of a desired transaction and customer transaction information and to process said customer payments manually tendered at said respective remote site;
wherein said transaction means is in communication with said plurality of agent processing means and said provider processing systems via said network, and receives said customer selections and customer transaction information from said agent processing means and facilitates performance of said customer selected transactions.

57. The system of claim 50 wherein said network includes the Internet.

58. The system of claim 50 wherein said customer selected transaction includes payment of a bill.

59. The system of claim 50 wherein said payment information includes credit card information of said service provider.

* * * * *

UNITED STATES PATENT AND TRADEMARK OFFICE
CERTIFICATE OF CORRECTION

PATENT NO. : 7,296,003 B2  Page 1 of 1
APPLICATION NO. : 09/931187
DATED : November 13, 2007
INVENTOR(S) : Mersky et al.

It is certified that error appears in the above-identified patent and that said Letters Patent is hereby corrected as shown below:

At column 16, line 44 (claim 22, line 5) of the printed patent, "processor to receive" should read --processor configured to receive--

At column 16, line 46 (claim 22, line 7) of the printed patent, "network in real time with" should read --network with--

At column 17, line 14 (claim 22, line 40) of the printed patent, "zccount" should read --account--

At column 22, after Claim 59 of the printed patent, insert the following claims:

--60. The system of claim 1 wherein the customer financial account information comprises customer financial card information.

61. The system of claim 22 wherein the customer financial account information comprises customer financial card information.

62. The method of claim 30 wherein the customer financial account information comprises customer financial card information.

63. The system of claim 50 wherein the customer financial account information comprises customer financial card information.--

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,296,003 B2 | Page 1 of 1 |
| APPLICATION NO. | : 09/931187 | |
| DATED | : November 13, 2007 | |
| INVENTOR(S) | : Mersky et al. | |

It is certified that error appears in the above-identified patent and that said Letters Patent is hereby corrected as shown below:

At column 16, line 44 (claim 22, line 5) of the printed patent, "processor to receive" should read --processor configured to receive--

At column 16, line 46 (claim 22, line 7) of the printed patent, "network in real time with" should read --network with--

At column 17, line 14 (claim 22, line 40) of the printed patent, "zccount" should read --account--

At column 22, line 48, after Claim 59 of the printed patent, insert the following claims:

--60. The system of claim 1 wherein the customer financial account information comprises customer financial card information.

61. The system of claim 22 wherein the customer financial account information comprises customer financial card information.

62. The method of claim 30 wherein the customer financial account information comprises customer financial card information.

63. The system of claim 50 wherein the customer financial account information comprises customer financial card information.--

This certificate supersedes the Certificate of Correction issued December 22, 2009.

Signed and Sealed this

Nineteenth Day of January, 2010

David J. Kappos
*Director of the United States Patent and Trademark Office*